United States Patent [19]

Fleck

[11] Patent Number: 5,781,746

[45] Date of Patent: Jul. 14, 1998

[54] MICROPROCESSOR WITH MULTIPLE BUS CONFIGURATIONS

[75] Inventor: Rod Fleck, Frisco, Tex.

[73] Assignee: Siemens Aktiengesellschaft, Munich, Germany

[21] Appl. No.: 854,371

[22] Filed: May 12, 1997

Related U.S. Application Data

[63] Continuation of Ser. No. 447,770, May 23, 1995, abandoned, which is a continuation-in-part of Ser. No. 208,078, Mar. 9, 1994, abandoned, which is a continuation of Ser. No. 734,209, Jul. 22, 1991, abandoned.

[30] Foreign Application Priority Data

Jul. 20, 1990 [DE] Germany ............... 90-113991.5

[51] Int. Cl.$^6$ ................................. G06F 13/40
[52] U.S. Cl. ......................................... 395/306
[58] Field of Search ............................ 395/500, 306, 395/307

[56] References Cited

U.S. PATENT DOCUMENTS

| | | | |
|---|---|---|---|
| 4,112,490 | 9/1978 | Pohlman et al. | 395/287 |
| 4,144,562 | 3/1979 | Cooper | 395/307 |
| 4,296,469 | 10/1981 | Gunter et al. | 395/308 |
| 4,447,878 | 5/1984 | Kinnie et al. | 395/307 |
| 4,509,120 | 4/1985 | Daudelin | 395/550 |
| 4,626,985 | 12/1986 | Briggs | 395/800 |
| 4,641,261 | 2/1987 | Dwyer et al. | 395/883 |
| 5,293,468 | 3/1994 | Nye et al. | 395/131 |
| 5,359,717 | 10/1994 | Bowles et al. | 395/325 |
| 5,483,660 | 1/1996 | Yishay et al. | 395/280 |

FOREIGN PATENT DOCUMENTS

| | | |
|---|---|---|
| 31 13 870 | 10/1982 | Germany . |
| 25 60 474 | 10/1986 | Germany . |
| 86/00436 | 1/1986 | WIPO . |

OTHER PUBLICATIONS

Computer Design Publ. 29(1990) Mar. 1, No. 5, pp. 24, 26, "Multibus I stretches to 32 bits".

Siemens Components Publ. XXII (1987)Oct., No. 5, pp. 178 and 179.

Primary Examiner—David Y. Eng
Attorney, Agent, or Firm—Herbert L. Lerner; Laurence A. Greenberg

[57] ABSTRACT

A microprocessor includes a processor unit with an internal bus and a programmable bus control unit with an external bus. The bus control unit interconnects the internal bus with the external bus through multiplexers, latches and control logic. An 8 and 16-bit multiplexed bus mode and an 8 and 16-bit non-multiplexed bus mode are programmable. The bus control unit generates all of the necessary control signals adjusting their timing to the respective bus type. Different bus configurations can be selected for several address ranges through different control registers. The timing of the bus signals is programmable to allow slower peripherals to be connected to the microprocessor.

12 Claims, 4 Drawing Sheets

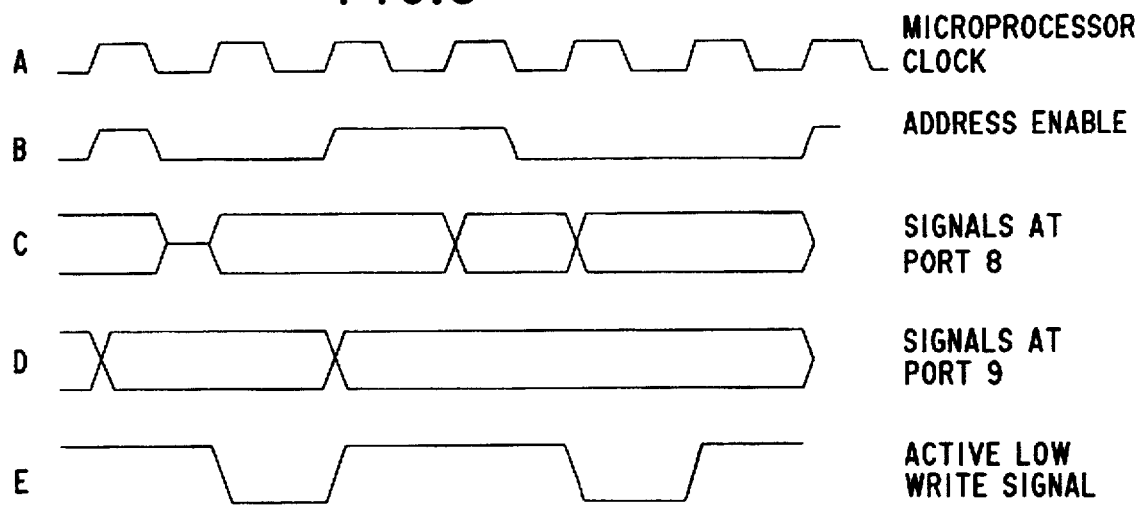
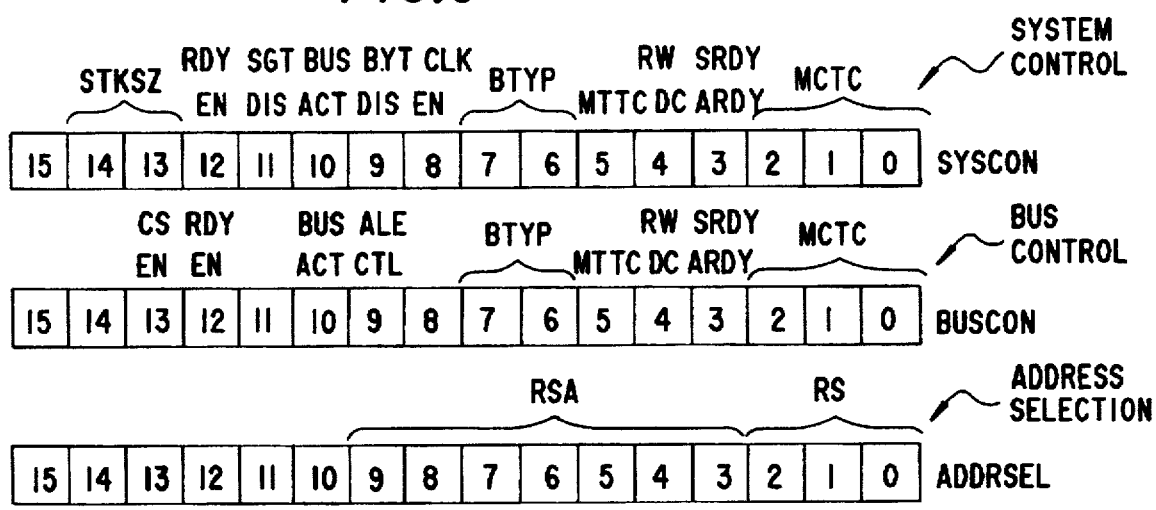
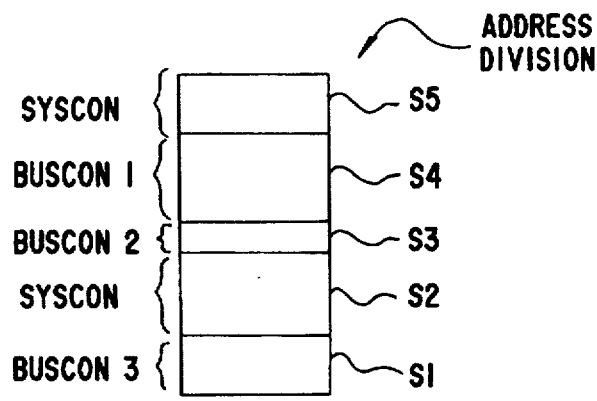

FAST PERIPHERAL ACCESS

SLOW PERIPHERAL ACCESS

| | | | | | | | | | | | | | | | | RANGE START ADDRESS | LS SELECTION | | | RANGE SIZE AND START ADDRESS BOUNDARIES |
|---|---|---|---|---|---|---|---|---|---|---|---|---|---|---|---|---|---|---|---|---|
| | | | | | | | | | | | | | | | | | 0 | 0 | 0 | 2K |
| | | | | | | | | X | X | X | | | | | | | 0 | 0 | 1 | 16K |
| | | | | | | | X | X | X | X | | | | | | | 0 | 1 | 0 | 32K |
| | | | | | | X | X | X | X | X | | | | | | | 0 | 1 | 1 | 64K |
| | | | | | X | X | X | X | X | X | | | | | | | 1 | 0 | 0 | 128K |
| 15 | 14 | 13 | 12 | 11 | 10 | 9 | 8 | 7 | 6 | 5 | 4 | 3 | | | | | 2 | 1 | 0 | BIT |

MICROPROCESSOR WITH MULTIPLE BUS CONFIGURATIONS

CROSS-REFERENCE TO RELATED APPLICATIONS

This application is a continuation of Ser. No. 08/447,770, filed May 23, 1995, now abandoned, which is a continuation-in-part of application Ser. No. 08/208,078, filed Mar. 9, 1994, now abandoned, which is a continuation of application Ser. No. 07/734,209, filed Jul. 22, 1991, now abandoned.

BACKGROUND OF THE INVENTION

FIELD OF THE INVENTION

The invention relates to a microprocessor, having an internal bus with data, address and control lines.

Most microprocessors or microcontrollers use similar external bus configurations to communicate with external memory and peripheral devices. Such buses provide the ability to read and write byte or word-wide data (8, 16, 32 and 64-bit) to the peripherals through a plurality of data, address and control lines. The so-called buses represent the primary communication path of microprocessors or microcontrollers. In general, two types of buses have become common.

A first bus concept, which relates to multiplexed buses, allows a single set of wires to transfer both address and data information between the processor and an external device. The number of wires is normally equal to the primary data size or the number of bits required to represent the address range. Additionally, several control signals are provided in order to control communication between the microprocessor and the peripherals. In particular, an ALE-signal indicates whether or not the bus lines forming the multiplexed bus are used for addresses. The Read/Write lines specify whether or not the multiplexed bus is used for data and the direction in which the multiplexed bus will be driven. During the time that the ALE-signal is present, the peripheral device must not drive the bus. Otherwise the system would collapse because at that time the multiplexed bus transfers address signals, and therefore a data transfer is impossible. The multiplexed bus concept became very popular in the first single chip microprocessors or microcontrollers, due to the low number of pins and board routes which were required. Such a bus system has been used in many previous Intel and Intel compatible microprocessors or microcontrollers (e.g. it can be seen in the Siemens Microcomputer Components Data Catalog 1988 page 41 ff).

The second bus concept, which is non-multiplexed buses, requires two independent buses where an address is transferred over one bus and data are transferred on a second bus. Since two pieces of information can be transferred at one time, the non-multiplexed bus normally provides better performance. Additionally, in this bus concept, several control signals for controlling the data transfer are provided. An ALE-signal for separating address signals from data signals is not necessary in the second bus concept. In such a case, a signal is only necessary to indicate that the address signals on the bus are stable. Interface delays tend to be better since address buses are send-only buses whereas data and multiplexed buses must be "tri-stated" during data read cycles, which incur "tri-state" to on and to off delays. Such a bus has become more common today due the increased performance and the decreasing cost of pins and board routes. That bus type has been incorporated in many of the Motorola microprocessors. German Patent DE 25 60 474 C2, for example, shows a microprocessor using such a bus type.

However, many different interface chips, memories or peripherals exist, and in general, it is not possible to adapt one chip that is constructed for the first bus, to the second bus type and vice versa. In order to connect chips with different interfaces, some amount of logic devices are required in order to allow interface signals to be adapted to one or the other.

In general, the majority of peripheral chips today provide multiplexed bus interfaces in order to reduce package size and costs. In many cases, that does not limit the developer of the system since a small amount of data is transferred to and from such devices. However, in the case of memory, the costs of using multiplexed buses can degrade system performance substantially where a large amount of data must be transferred. Such a bus has become more unpopular in newer systems in which the number of internal cycles to perform an operation has decreased to the point where the bus can become the limiting factor. Memory speeds have also been scaled up in such a way that access times are not limiting possible data throughput.

In many cases, peripheral chips have provided multiple bus interface logic in order to increase market share by selling into both environments. A description of one of these, the Siemens SAB 82 257, is published in Siemens Microcomputer Components Data Catalog 1988, page 635. Such devices have proven very effective in single bus type systems if no high-speed access is demanded, but even the peripheral chips need some external hardware to support two different bus configuration.

Thus in systems where the multiplexed bus has become the limiting factor over the internal system architecture, many system developers prefer to switch to faster non-multiplexed bus configurations. Since many products contain a number of subsystems where system developers prefer to only modify portions of the system in order to reduce cost and development times to market, it is advantageous to support older subsystems as well which do not limit the system performance with new faster subsystems.

It is also very often necessary to slow down several control signals, whenever a very fast microprocessor communicates with a slow peripheral device. Slow memory devices, like EPROM's, need the insertion of several "wait-states" for data reading.

Today's versions of microcontrollers and microprocessors do not allow the user to actively switch bus configurations.

SUMMARY OF THE INVENTION

It is accordingly an object of the invention to provide a microprocessor with multiple bus configurations, which overcomes the hereinafore-mentioned disadvantages of the heretofore-known devices of this general type and which provides an external bus that supports multiplexed and non-multiplexed bus types with different data bus widths for both bus types, without the need for additional interface hardware to connect different bus type devices to the external bus of the microprocessor.

With the foregoing and other objects in view there is provided, in accordance with the invention, a microprocessor, comprising an internal bus with data, address, and control lines, an external bus with external lines, and programmable bus control means for connecting a plurality of the external lines with the internal bus and forming multiplexed or non-multiplexed data and address lines and a programmable data bus width of the external bus in response to programming of the bus control means.

In accordance with another feature of the invention, the bus control means generate an address-control signal supplying an external bus control line, the address-control signal indicates if the multiplexed bus leads have valid address signals, and the address-control signal has an extendable length.

In accordance with a further feature of the invention, after switching from a non-multiplexed bus mode to a multiplexed bus mode the length of the address-control signal during a first following multiplexed bus access is increased.

In accordance with an added feature of the invention, there is provided at least one control-register, the control-register storing at least data, the data indicating an address range, the data indicating a width of the external data bus for a valid address range, and the data indicating whether the external bus is a multiplexed or non-multiplexed bus for the address range.

In accordance with an additional feature of the invention, the control-register data indicate if a chip-select signal will be generated.

In accordance with yet another feature of the invention, there is provided at least one control-register, the at least one control register storing data indicating at least if and how many wait-states during an external peripheral access will be generated.

In accordance with yet a further feature of the invention, the data indicate at least if one of the external bus control lines is used as a ready-input line, and a signal on the input line indicates if an access to an external peripheral device has been completed so that data on the external data bus lines are available.

In accordance with yet an added feature of the invention, the signal on the ready-input line is only checked after a programmed number of wait-states has been achieved.

In accordance with yet an additional feature of the invention, the data determines at least whether the ready-input signal is to be used in an asynchronous or synchronous mode.

In accordance with again another feature of the invention, there is provided at least one control-register, one of the external bus control lines being used as a read/write signal line, and the control register storing data determining whether a signal on the read/write signal line will be delayed during an external bus access.

In accordance with again an further feature of the invention, there is provided at least one control-register, the control register storing data determining if a tri-state time of the external address-bus will be increased during a multiplexed bus mode.

In accordance with a concomitant feature of the invention, there are provided external lines not being used in the multiplexed bus mode, the external bus being a multiplexed bus, and the address signals being additional driven on the external lines.

The basis of the invention is to supply a microprocessor or microcontroller with a bus control unit that allows users to be able to perform any combination of multiplexed and non-multiplexed bus accesses without changing software or hardware. This bus control unit connects the internal address and data lines to the external pins of the processor in a way that either a multiplexed or a non-multiplexed external bus configuration is built. The control unit also generates all necessary control signals for the respective bus type and/or connects a control signal line which the processor already supports to the respective output pin of the microprocessor or microcontroller.

Other features which are considered as characteristic for the invention are set forth in the appended claims.

Although the invention is illustrated and described herein as embodied in a microprocessor with multiple bus configurations, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 5 is a diagram showing 3 control registers SYSCON, BUSCON, ADDRSEL of a microprocessor according to the invention;

FIG. 6 is a diagram showing a divided address space, with each address space representing a different bus structure;

FIG. 8 is a timing diagram for a multiplexed bus access following a non-multiplexed bus access.

DESCRIPTION OF THE PREFERRED EMBODIMENTS

Figure 1:
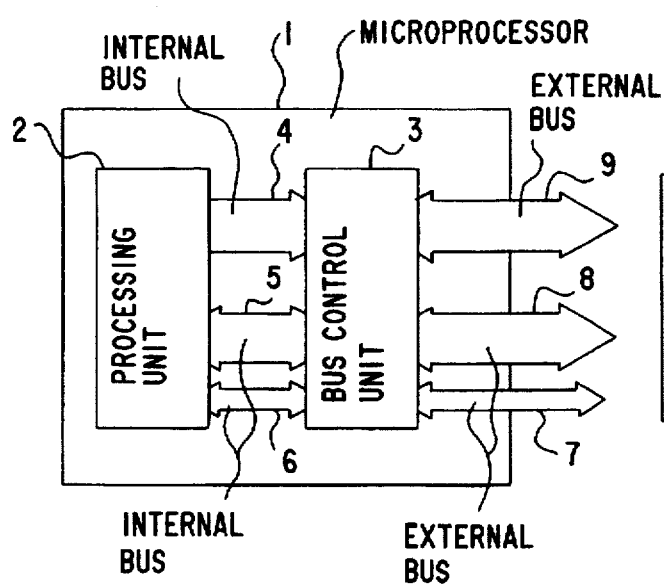
FIG. 1 is a block circuit diagram of an embodiment of the invention.

Referring now to the figures of the drawing in detail and first, particularly, to FIG. 1 thereof, there is seen a microprocessor or microcontroller 1 formed of a processor unit 2 with an internal address bus 4, an internal data bus 5 and an internal control bus 6 which are connected to a bus control unit 3. The data bus width can be 8, 16, 32 or more bits. The width of address and control buses 4, 6 is formed according to the address space of the processor 2. Furthermore the data bus 5 and the address bus 4 will be assumed to be 16 bit wide. For its part, the bus control unit 3 provides two programmable input/output ports 8, 9 and an additional control port 7, which are connected to external pins of the microprocessor or micro-controller 1 and form an external bus.

According to the invention, the bus control unit 3 of the microprocessor 1 allows different external bus configurations. The internal buses 4, 5, 6 provide an optimum interconnection between the processor unit 2 and the bus control unit 3 based on the internal timing of the part. The bus control unit 3 allows transfers from the processor unit 2 to be buffered and interconnected to external peripherals through the buses 7, 8, 9. It is important that the two sets of buses, that is the internal busses 4, 5, 6 and the external busses 7, 8, 9, normally have very different control structures. The bus control unit 3 is programmable and depending on the bus configuration which has been programmed, the bus control unit 3 interconnects the external bus lines 7, 8, 9 with the respective internal buses 4, 5, 6, converts the timing and if necessary latches signals of the buses. This can be done, for example, through different multiplexers, latches and control logic. For example, a microprocessor according to the invention could have several external ports. Depending on programming, the bus control unit connects the external ports with the respective internal address, data and control lines. One can also use unused parts for non-bus operation if they are not required for bus operation. In order to program the bus control unit 3, several registers are provided which will be explained below. The different control signals, which are needed for the multiplexed or the non-multiplexed bus type, are also generated by means included in the bus control unit 3. These control signals can be supported through an additional port.

The bus control unit 3 determines whether or not control signals will be lengthened in the case of switching from one bus type to another. Furthermore, the control unit 3 can generate "wait-states" or a "Read/Write" signal, it can evaluate a "Ready" signal which will be generated by a peripheral device and it can switch the external bus lines into a "tri-state" mode. Another feature of the microprocessor according to the invention is that within the bus control unit 3, for example, a first SYSCON register and four BUSCON registers can be provided. The SYSCON register allows the user to define the standard external bus type of the microprocessor. Corresponding to their programming, the four BUSCON registers define four independent address ranges for different bus types and bus sizes. Moreover, the bus control unit can generate "chip-select" signals for SYSCON and BUSCON register-defined address ranges. These registers are programmable by the user through the processor unit 2. The quantity of BUSCON-registers is not limited to four.

Figure 2:
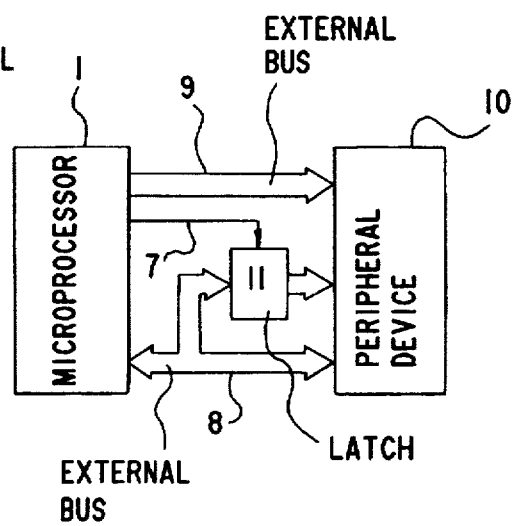
FIG. 2 shows is a block circuit diagram of a first application of a microprocessor according to the invention.
Figure 3:
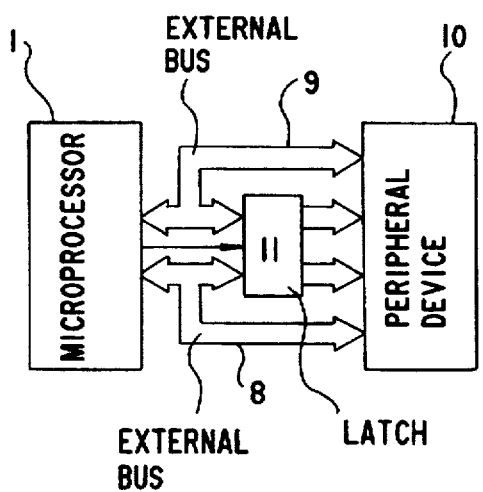
FIG. 3 is a block circuit diagram of a second application of a microprocessor according to the invention.
Figure 4:
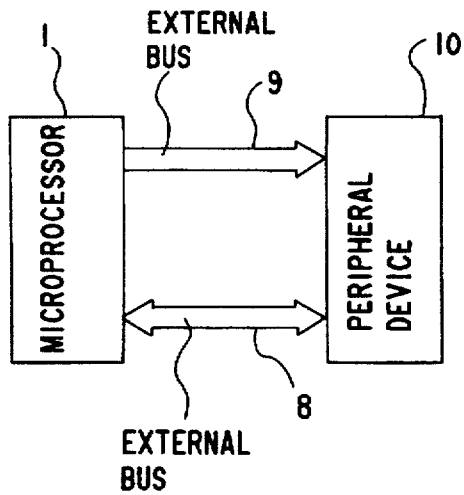
FIG. 4 is a block circuit diagram of a third application of a microprocessor according to the invention.

FIG. 2 to FIG. 4 are examples of applications of the above-mentioned embodiment of the invention. FIG. 2 shows a multiplexed 8-bit wide data bus configuration. The microprocessor 1 is connected through 8 bits of a first port 8 of the input/output ports to a peripheral device 10. The same 8 lines of the port 8 are also connected to a latch 11 which for its part connects a first part of the peripheral device 10 address bus with the port 8. In some cases, the latch will be integrated into the peripheral device 10. The second part of the peripheral device 10 address bus is directly connected with 8 bits of a second port 9 of the input/output ports of the microprocessor 1. Since this second bus is a non-multiplexed address bus port 9, it can be programmed as an unidirectional port, otherwise the first port 8 must be a bidirectional port because it supplies the peripheral device with address and data information. In order to provide a clear illustration, only one control line 7 is shown, which controls the address latch.

FIG. 3 shows a multiplexed 16-bit wide data bus configuration. All of the interconnections between the microprocessor 1 and the peripheral device 10 are the same as shown in FIG. 2, except for the interconnection between the second port 9 and the peripheral device 10. Since 16 data lines are needed, this port 9 connects the upper 8 data lines of the microprocessor 1 with the respective data lines of the peripheral device 10. The port 9 is also connected to the latch 11 which now latches 16-bit address signals. In this case, both of the ports 8, 9 of the microprocessor are multiplexed. Again, the control bus is not shown for clarity, except for the address latch control line 7.

The latch 11 shown in FIGS. 2 and 3 is normally included in Intel compatible peripheral devices.

FIG. 4 shows an application of a non-multiplexed bus configuration with the same microprocessor or microcontroller depicted in FIGS. 2 and 3. The microprocessor 1 is interconnected to a peripheral device 10 through a first port 8 which transfers bidirectional data information. Alternatively, 8 or 16 bits of the port 8 can be used according to the bus width. The second 16-bit wide port 9 interconnects the processor 1 address lines with the respective inputs of the peripheral device 10. Again, the control bus is not depicted in FIG. 4.

According to the invention other combinations of microprocessor ports and peripheral devices are also conceivable.

A core control processor unit (CPU) requires a set of special function registers to maintain system state information, to provide for system configuration options, to control code memory segmentation and data memory paging and so on. Many of these registers can be modified explicitly by the programmer, and can be updated implicitly by the CPU during normal instruction processing.

FIG. 5 shows three special 16 bit-wide registers included in the bus control unit. The first, the SYSCON register, is a bit-addressable register that provides system configuration and control functions. This register is divided into several parts. An MCTC bit field (bit 0 . . . 2) and MTTC (bit 5) and RWDC (bit 4) bits within the SYSCON register are provided for varying external bus timing parameters, as follows. The memory cycle can be extended by the processor state time in a range from 0 through 15 or from 0 through 7 if the READY function is used by means of the MCTC bit field. Through the use of the MTTC bit, the memory tri-state time can be extended by either '1' or '0' additional state times. The memory tri-state time is additionally extended by one state time whenever a multiplexed external bux configuration is selected. An additional Read/Write signal delay of half a state time can be programmed through the RWDC bit. A two-bit field BTYP (bits 6, 7) reflects the external bus configuration mode that is currently selected. Four different bus configurations are provided. These are: 8 or 16-bit multiplexed and 8 or 16-bit non-multiplexed bus configurations. The clock output function becomes enabled by setting a CLKEN bit (bit 8) of the SYSCON register to '1'. If enabled, the respective port pin takes on its alternate function as CLKOUT output pin. A BYTDIS bit (bit 9) controls the active low byte high enable pin of the microprocessor. The function of this pin is enabled if the BYTDIS bit contains a '0'. Otherwise, it is disabled and the pin can be used as standard I/O pin. The pin is implicitly used by the bus control unit to select one of two byte organized memory chips which are connected to the micro-processor through a word wide external data bus. A BUSACT bit (bit 10) enables the SYSCON or any BUSCON register. If it is set to '0' no external bus will be configured. When only 16 address lines are used, the memory space is limited to 64K bytes in the non-segmented mode. An SGTDIS bit (bit 11) allows a selection of either a segmented or non-segmented memory mode. In case of a non-segmented memory mode (SGTDIS= "1"), the entire address space is restricted to 64K bytes, and thus only 16-bit addresses are required to address memory locations within segment 0. In case of a segmented memory mode (SGTDIS="0"), additional port pins are used to generate a physical 18-bit address. Of course any other address bus width could be implemented. An RDYEN bit (bit 12) provides an optional Data-Ready function through the active low READY input pin to allow an external memory controller or peripheral to determine the duration of an external memory access. If enabled, an active low signal on the READY input pin signifies that data is available, and must be latched by the bus control unit. Additionally, an SRDY/ARDY bit (bit 3) determines whether a synchronous or asynchronous READY-function is used. The two STKSZ bits determine the size of the system stack from 32 words up to 256 words. Bit 15 of the SYSCON register can be used in future implementations.

The second, BUSCON, register is provided four times. Its structure is almost like that of the SYSCON register except for bits 8, 9, 11, 13, 14. All of the other bits control the same functions as the respective bits of the SYSCON register. For each BUSCON register, there is provided a respective ADDRSEL register. This ADDRSEL register defines the valid address range of the respective BUSCON register. Bits 8, 11, 14, 15 of the BUSCON registers can be used for future implementations. Unlike to the SYSCON register, bit 9 of the BUSCON register determines whether or not a lengthened ADDRESS Enable Latch signal will be generated. This may be relevant in a multiplexed bus configuration whenever the microprocessor does an access to slower peripherals. Another special feature of the BUSCON register provides a CSEN bit (bit 13). If this function is enabled, the bus control unit generates a chip-select signal on the respective port pin for the address range defined in the respective ADDRSEL register.

The ADDRSEL register allows the user to define an address range which defines the bus configuration, the timing and the other features which are fixed by the respective BUSCON register. The first three RS bits (bit 0 ... 2) define a range size and the following seven RSA bits (bits 3 ... 9) define a range start address. The range sa multiple of the always be a multiple of the range size.

Figures 7, 9:
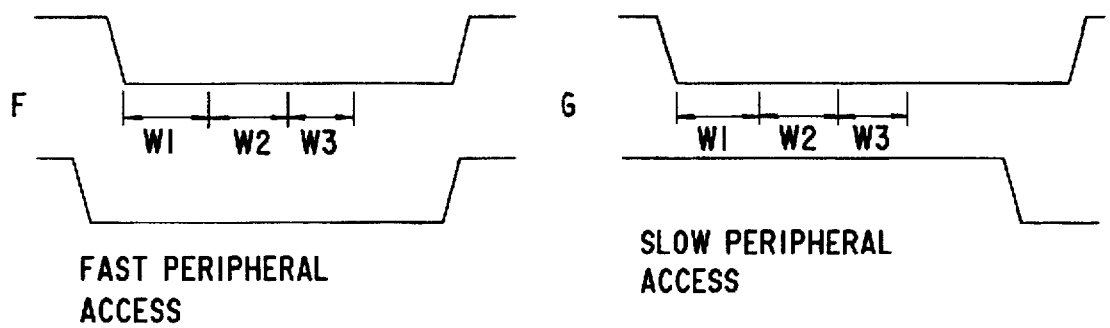
FIG. 7 is a diagram showing different selections for the ADDRSEL register.
FIG. 9 is a timing diagram which shows a peripheral access with "wait-states" and "Ready" signals.

FIG. 7 depicts a diagram which shows five different selections for the ADDRESEL register. The range size is from 2K to 128k bytes in this case. The range start address is reduced respectively. For example, if the range size is set to 32K in the RS bit field, only three further bits are needed to define the range start address in the RSA bit field, since the total address range is 256K bytes in this example. The selection sizes must be adjusted for other address ranges.

FIG. 6 shows an example of a divided address range by means of three BUSCON registers. First the SYSCON register defines the standard bus type and functions of the whole address range. After programming three of the four BUSCON registers, the total address range is divided into five parts S1 ... S5. The part S2 and the part S5 are defined by the SYSCON register and the other parts S1, S3, S4 are defined by the respective BUSCON registers. In this way, it is possible to divide the address range into parts with different bus configurations and bus widths. For example, the part S1 is addressable as a non-multiplexed 16-bit wide bus type, the part S3 as a multiplexed 8-bit wide bus, the part S4 as a non-multiplexed 8-bit wide bus and the parts S2, S5 as a multiplexed 16-bit wide bus.

With such a microprocessor according to the invention, users will be able to perform any combination of multiplexed and non-multiplexed accesses without changes in software or hardware. Bus types are strictly determined after the address for the read, write, or fetch access address has been sent to the bus control unit. No special instructions or address modes are required. Once the address range tests of the BUSCON registers have been made, one will be selected, or the SYSCON register will be selected when no BUSCON register is selected.

In most cases, switching from one bus type to the next will cause no problems in timing. These include each of the following combinations:

MUX-MUX: multiplexed bus accesses followed by any other multiplexed bus access with different wait state characteristics or different bus widths.

NMUX-NMUX: non-multiplexed bus accesses followed by any other non-multiplexed bus access with different wait state characteristics or different bus widths.

MUX-NMUX: any non-multiplexed bus access can immediately follow any other multiplexed bus access with different wait state characteristics or different bus widths, since the address bus is always immediately free.

Each of the above cases also do not cause any timing problems if free bus or multiple bus master cycles occur in between these accesses.

In cases where a multiplexed bus access follows a non-multiplexed bus access (NMUX-MUX), an additional wait state will be required to hold the outgoing multiplexed address until the non-multiplexed data access has truly been completed. This wait state can always be inserted by the bus control unit whether free bus or multiple bus master cycles occur in between these accesses. This performance loss is only seen for the first multiplexed access after a non-multiplexed access, in such a way that multiple following accesses will not incur bus change penalties. In this way, any timing problem causing a bus collision that could occur will be avoided.

FIG. 8 is a timing diagram, showing a multiplexed bus access following a demultiplexed bus access. A stands for a processor clock signal; B stands for an address enable signal which has different meanings in multiplexed and non-multiplexed bus configuration; C stands for the signals at the port 8; D stands for the signals at the port 9; and lastly E stands for the active low write control signal. The left part of the diagram depicts a non-multiplexed bus access and the right part depicts a multiplexed bus access. The range in between the dotted vertical lines shows the insertion of the additional wait state. In a non-multiplexed bus access, the port 8 only drives data signals and the port 9 only drives address signals. In the following multiplexed bus access, shown to the right of the second dotted line, the port 8 first drives the new address signals and after latching of these, the port 8 switches to drive the respective data signals.

Since many different peripheral devices exist and the access timing thereof changes from type to type, the processor according to the invention provides several possibilities for affecting the timing control of the bus control unit. As described above, the new processor allows the user to define the number of wait states from 0 to 15 or from 0 to 7 (when READY is enabled) for slow or fast peripherals. Furthermore, a read/write delay control is provided, and the memory tri-state time can be affected. The new processor also allows the user to connect two memories differing in access-timing or peripherals in between one defined address range. This is possible since the bus control unit always inserts the programmed wait states and afterwards checks the READY input pin. Although the READY function is implemented through the respective RDYEN bit of the SYSCON or BUSCON register, the bus control unit always inserts the wait states. In this way, it is possible to connect a peripheral which needs up to seven wait-states and a second slower peripheral which will be controlled through the READY input. Thus, it is not necessary to define two address ranges for two such peripherals that are different in timing.

FIG. 9 is a timing diagram, showing the access of two peripherals that are different in timing. At reference symbols F and G, an upper signal stands for the active low read control signal and a lower signal stands for the active low ready input signal. It is assumed that the respective BUSCON or SYSCON register is programmed in such a way that three wait states are generated and an asynchronous READY function is implemented. Reference symbol F stands for fast peripheral access and reference symbol G stands for slow peripheral access. The READY input pin is always checked after running off the programmed wait states. Thus, in the case G for reasons of a high READY level, additional wait states will be generated.

In a multiplexed bus mode it is often very complicated for the user to find structural faults in an application. Therefore, a special feature can be implemented into a microprocessor according to the invention. When a multiplexed bus access is made in a system where any BUSCON or SYSCON has had a non-multiplexed access selected, the address will be also driven on an additional port with similar timing to a non-multiplexed access. Preferably, in the above explained examples, the port 9 which drives the address signals in the non-multiplexed bus mode could be used for this, but any other port which is not used in the system can also be used for this debugging feature.

Figure 10:
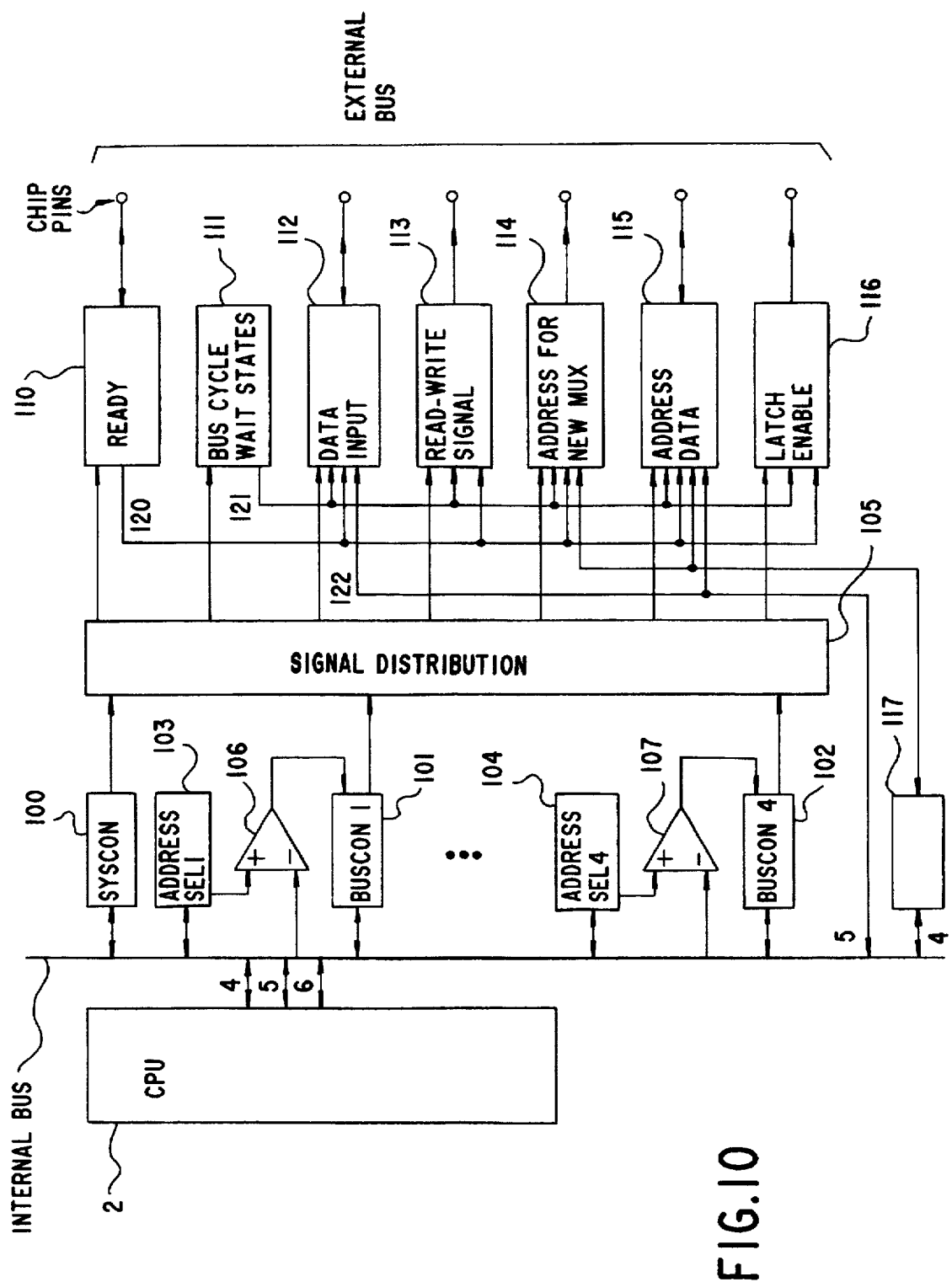
FIG. 10 is a detailed block diagram of the microprocessor according to FIG. 1.

In FIG. 10 a detailed arrangement of the microprocessor according to FIG. 1 is presented. The same elements are given same reference numerals as in FIG. 1. The central processor unit 2 exchanges via the internal buses 4, 5 and 6 respective data, address, and control signals with the various units connected thereto.

Specifically, the microcontroller according to FIG. 6 includes a SYSCON register 100 and three BUSCON registers, of which for the sake of clarity only the first BUSCON's register 101 and the third BUSCON's register 102 are shown. The SYSCON register contains global setting for the entire range of addresses of the microprocessor. In one of the BUSCON registers there are accordingly stored bus parameter settings only for a given address range assigned to that BUSCON register. Examples of corresponding SYSCON/BUSCON register settings are shown in FIG. 5. The settings can be loaded into the registers by the CPU 2. To that end the BUSCON 1 register is selected, if an address present on address bus 4 falls in the respective address range provided for that BUSCON 1 register 101.

In order to activate the BUSCON 1 register, an address selection register ADDRSEL 103 is provided, by means of which the address present in the address selection register 103 is compared by means of address comparator 106 with the address bus 4, by means of which the on the address bus 4 present address is compared with the address stored in the address selection register 103, using the address comparator 106.

If the comparison is affirmative, the BUSCON 1 register 101 is activated. The same is true for the BUSCON 2 register 102 to which is assigned the address selection register 104 and an address comparator 107.

A signal distribution device 105 serves for distribution of the steering signals provided from the SYSCON/BUSCON registers to the input/output devices 110 . . . 116, through which the data-address and control signals for the external data bus 9, 8, 7 are generated. A READY-steering unit 110 is provided in order to determine if the external bus is ready for a bus access. The READY-steering unit 110 subsequently generates on its output 120 a signal by means of which the remaining devices 111 are activated. By means of device 111 the number of wait states are controlled, which must be considered for an access to the external bus. Device 111 generates at its output 121 a signal that is fed to the other input/output devices 112 . . . 116. A device 112 is provided for input and output of data. This device 112 is used when the external bus is to operate in non-multiplexed mode. To this end device 112 is connected via a connection 122 with the internal data bus 5. A device 113 is provided for generating read and write signals, by means of which it is determined whether a read-or write process is to be performed on the external bus. A device 114 is provided for generating address signals. For this purpose device 114 is connected with the internal address bus 4. An intermediately wired device 117 serves for converting the chip-internal addresses to the external addresses. A device 115 serve to generate address signals for the non-multiplexed bus operation as well as for generating address-and data signals, if a multiplexed bus access is to follow. To this end the device 115 is connected with the internal address-and data busses 4 and 5. A device 116 serves for generating chip selection signals, by means of which the external building blocks can be activated or deactivated.

Devices 110 . . . 116 may be embodied, for example, as finite-state machines, such finite-state machines generate in dependence on their immediately present state and on the state of their input signals a given sequence of output signals. The devices 110 . . . 116 can, accordingly, by means of the signal distribution device 105 already preparing control signals, independently generate the steering signals required for the respective bus access for the external bus.

The sequence of events for an external bus access take place as follows: When the CPU 2 initiates a bus access with a given address, either a SYSCON register 100 or one of the BUSCON registers 101, 102 is addressed. Thereby, if the address is within the address range of one BUSCON register, exactly that BUSCON register is activated. If none of the BUSCON registers 101, 102 is addressed, that SYSCON register 100 is activated which contains the global parameter settings for the external bus type. The devices 110–116 are supplied with control information via signal distribution device 105, so that they can independently perform the bus access procedure. In the described system it is advantageous that the external bus type is automatically determined by means of access address.

The above-explained concept for a multiple bus microprocessor or microcontroller can be realized in many ways. Multiple registers can be installed into the bus control unit, which control a variety of control signals and internal function blocks. The invention is applicable for any one chip or multi-chip microprocessor or one chip or multi-chip microcontroller.

I claim:

1. A microprocessor, comprising an internal bus having data lines, address lines and control lines, an external bus having a plurality of external lines for exchanging address information and data information between a peripheral device and said microprocessor, and programmable bus control means connected between said internal bus and said external bus for connecting a plurality of said external lines with said internal bus, said microprocessor addressing said peripheral device via said external lines to send and to receive data via said external lines, said bus control means operative for selectively defining sets of the external lines for one of a multiplexed and a non-multiplexed mode, wherein said bus control means include defining means and control means, whereby the control means are connected to said external bus and to said internal bus, and the defining means are connected to the control means, said defining means include at least a first register connected to the bus control means for indicating the control function for said external bus, whereby the control function in the multiplexed mode operates to first drive a first set of said external lines with address signals, and to drive at least one of said external lines as a control line to indicate to the peripheral device that the address signals must be latched, and next drive said first set of said external lines with data signals, and in the non-multiplexed mode the central function operates to define a second set of external lines as address lines and a third set of said external lines as data lines and to drive said address signals on said address lines and said data signals on said data lines, said defining means further including at least a second register which is connected to the control means for indicating the data bus width of said external bus, whereby the control means define in response to programming signals from said microprocessor a fourth set of said external lines as data lines, and driving said data signals on said data lines.

2. The microprocessor according to claim 1, wherein said bus control means are operative for generating said address signals for said external bus control lines, wherein said address signals indicate if said multiplexed bus leads have valid address signals, and if said address-control signal has an extendable length.

3. The microprocessor according to claim 2, wherein after switching from a non-multiplexed bus mode to a multiplexed bus mode the length of said address-control signal during a first following multiplexed bus access is increased.

4. The microprocessor according to claim 1, including:
at least one control-register,
said control-register operative for storing at least data,
said data indicating an address range,
said data indicating a width of said external data bus for a valid address range, and
said data indicating whether said external bus is a multiplexed or non-multiplexed bus for said address range.

5. The microprocessor according to claim 4, wherein said control-register data indicate if a chip-select signal is to be generated.

6. The microprocessor according to claim 1, including:
at least one control-register,
said at least one control register operative for storing data indicating at least if and how many wait-states will be generated during an external peripheral access.

7. The microprocessor according to claim 6, wherein said data indicate at least if one of said external bus control lines is used as a ready-input line, and a signal on said input line indicates if an access to said external peripheral device has been completed so that data on said external data bus lines are available.

8. The microprocessor, according to claim 7, wherein said signal on said ready-input line is only checked after a programmed number of wait-states has been achieved.

9. The microprocessor according to claim 8, wherein said data determines at least whether said ready-input signal is to be used in one of an asynchronous and synchronous mode.

10. The microprocessor according to claim 1, including:
at least one control-register,
one of said external bus control lines being used as a read/write signal line, and
said control register being operative for storing data for determining whether a signal on said read/write signal line will be delayed during a multiplexed bus mode.

11. The microprocessor according to claim 1, including:
at least one control-register,
said control register being operative for storing data for determining if a tri-state time of said external address-bus will be increased during a multiplexed bus mode.

12. The microprocessor according to claim 2, including external lines not being used in the multiplexed bus mode, said external bus being a multiplexed bus, and said address signals additionally being transmitted on said external lines.

* * * * *